United States Patent
Ganeshmani et al.

(10) Patent No.: US 10,659,219 B1
(45) Date of Patent: May 19, 2020

(54) WORKFLOW MANAGEMENT VIA DISTRIBUTED LEDGERS AND SMART CONTRACTS

(71) Applicant: Capital One Services, LLC, McLean, VA (US)

(72) Inventors: Jayaraman Ganeshmani, Plano, TX (US); Jacob Creech, Mckinney, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/549,263

(22) Filed: Aug. 23, 2019

(51) Int. Cl.
H04L 9/06 (2006.01)
H04L 9/14 (2006.01)
H04L 9/32 (2006.01)
H04L 9/00 (2006.01)

(52) U.S. Cl.
CPC ............ *H04L 9/0637* (2013.01); *H04L 9/006* (2013.01); *H04L 9/14* (2013.01); *H04L 9/3242* (2013.01); *H04L 2209/38* (2013.01)

(58) Field of Classification Search
CPC ..... H04L 9/0637; H04L 9/006; H04L 9/3242; H04L 9/3297; H04L 2209/38
See application file for complete search history.

(56) References Cited

U.S. PATENT DOCUMENTS

| 2019/0123889 | A1 | 4/2019 | Schmidt-Karaca |
| 2019/0164157 | A1* | 5/2019 | Balaraman ............ G06Q 20/102 |
| 2019/0213518 | A1* | 7/2019 | Lee ................... G06Q 10/06316 |

FOREIGN PATENT DOCUMENTS

| WO | 2019072270 A2 | 4/2019 |
| WO | 2019072292 A2 | 4/2019 |

* cited by examiner

*Primary Examiner* — Ellen Tran
(74) *Attorney, Agent, or Firm* — Banner & Witcoff, Ltd.

(57) ABSTRACT

Systems and methods as described herein may include creating and monitoring workflows in a blockchain network. A workflow may be implemented by using a smart contract or the steps in the workflow may be recorded in a distributed ledger in a blockchain network. Completion of a workflow step may be verified by identifying a blockchain transaction executed by the workflow step performer assigned to the workflow step. The blockchain transaction is associated with encryption keys of the workflow step performer assigned to the workflow step. The completion of the execution of a workflow may be verified by determining whether the status of the last workflow step is complete, and identifying a blockchain transaction associated with encryption keys of the workflow step performer assigned to the last workflow step.

20 Claims, 11 Drawing Sheets

WORKFLOW MANAGEMENT VIA DISTRIBUTED LEDGERS AND SMART CONTRACTS

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to workflow management and more specifically to methods and systems for workflow management using blockchain technology.

BACKGROUND

Workflows may allow enterprises to formalize processes by which they achieve their objectives. For example, a merchant selling goods may have a workflow for obtaining the goods, inputting orders and/or payments for the goods, selecting a shipper for shipping the goods, and updating an inventory record based on the sale.

Workflows may require multiple processes or workflow steps to be performed. The workflow steps may be dependent upon one another; for example, a workflow step may only be begun upon completion of one or more prior workflow steps. Additionally, the workflow steps may have more complex dependencies.

A workflow system may automate, to at least some degree, workflows in an enterprise by creating and monitoring workflows to execute various tasks. A workflow system may be developed using a graphical designer, a programming language, or a combination of the two. For code-based workflow design, workflow applications may be developed with any general-purpose programming language, but specialized workflow languages also exist, such as Business Process Model Notation (BPMN), XML Process Definition Language (XPDL), Yet Another Workflow Language (YAWL) and Simple Conceptual Unified Flow Language (SCUFL).

Such workflow systems are generally prone to attacks from malicious parties. A malicious party may masquerade as a workflow step performer without detection and manipulate data associated with the workflow steps (i.e., mark a workflow step as complete without performing the workflow step or remove one or more workflows from the workflow system). Thus, it is desirable to provide a workflow system that is not vulnerable to tampering by malicious parties.

Aspects described herein may address these and other problems, and generally improve the quality, efficiency, and security of workflow applications by using distributed ledgers and smart contracts on a blockchain network for storing workflows and validating completion of workflow steps by workflow step performers.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems, as described herein, may include creating and monitoring workflows in a blockchain network. A workflow system may receive a request to execute a task and generate a workflow for executing the task. The workflow may comprise a plurality of workflow steps where each workflow step may be assigned to one or more workflow step performers. The workflow may be implemented by using a smart contract or the steps in the workflow may be recorded in a distributed ledger in a blockchain network. The distributed ledger or the smart contract may be maintained by the systems themselves and/or a distributed network system.

The workflow application may determine that a workflow step is complete when the workflow system identifies a blockchain transaction executed by the workflow step performer assigned to the workflow step. The workflow system validates the status of the workflow step by determining whether the blockchain transaction is associated with encryption keys of the workflow step performer assigned to the workflow step. The workflow system may also determine completion of the execution of a workflow by determining whether the status of the last workflow step is complete, and whether the status is validated by a blockchain transaction associated with encryption keys of the workflow step performer assigned to the last workflow step.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
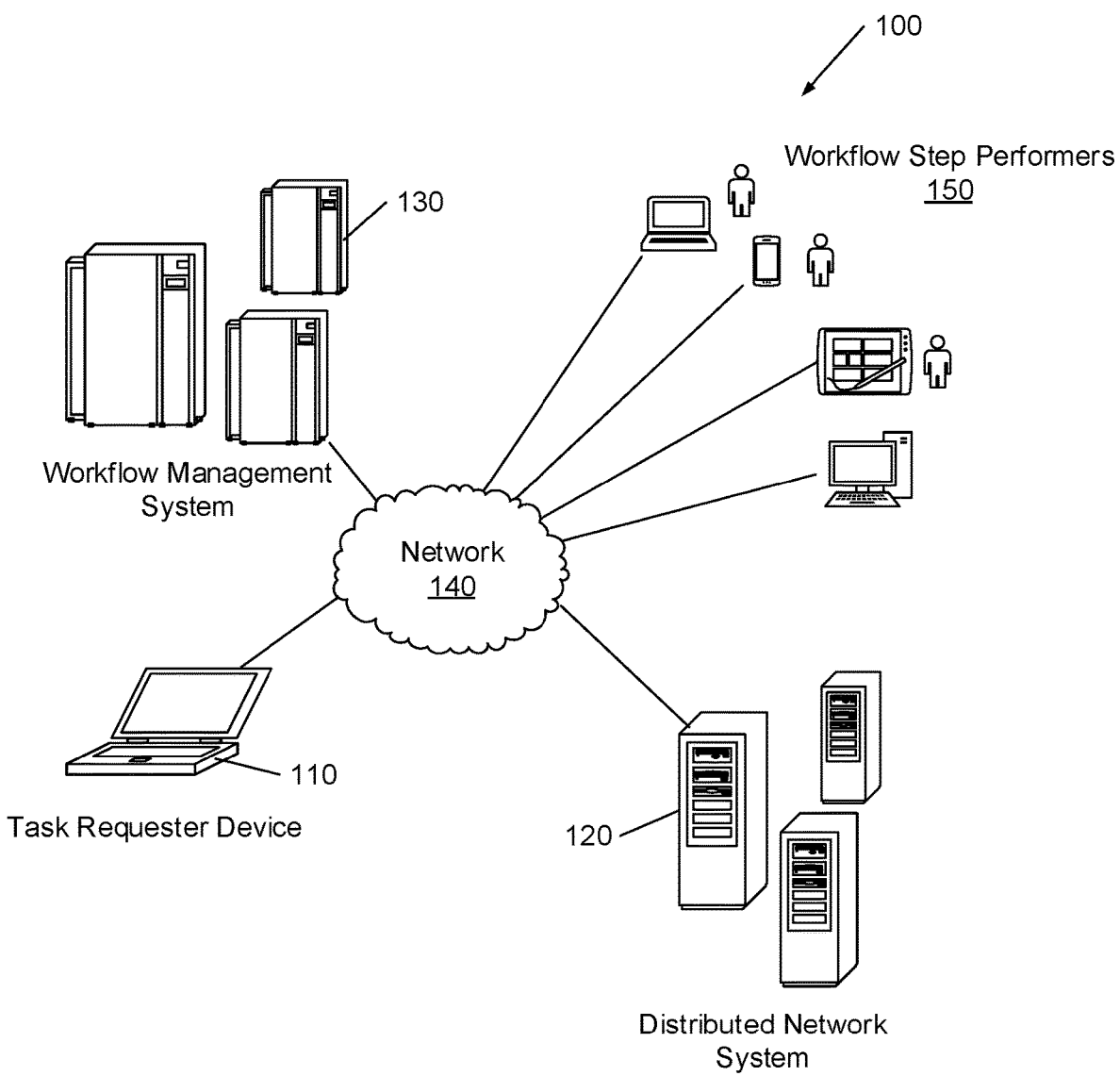
FIG. 1 shows an architectural level schematic of a workflow management system according to one or more aspects of the disclosure.

In the following description of the various embodiments, reference is made to the accompanying drawings, which form a part hereof, and in which is shown by way of illustration, various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for managing workflows in order to execute various tasks in an organization. A workflow management system may provide an infrastructure for the set-up, performance, and monitoring of the tasks, arranged as workflows. The workflow management system may create different workflows for different types of tasks. A workflow may comprise one or more workflow steps. A workflow step may be assigned to one or more workflow step performers. The workflow step performers may be an individual, a group, or one or more computing systems. The assigned individual, group, or computing system is responsible for performing the specific workflow step. Once a workflow step is complete, the workflow management system ensures that the workflow step performers responsible for the next workflow steps are notified and receive the data they need to execute the workflow step assigned to them.

The workflow systems may interact with a plurality of workflow step performers outside the workflow system in order to execute the tasks. However, interacting with computing devices outside the workflow system has a number of drawbacks and limitations. A malicious party may gain access to the workflow system and manipulate data related to one or more workflows.

Workflow management systems may allow for workflow management without the drawbacks of existing systems. Workflow management systems, as described herein, may be implemented in a distributed network, such as a blockchain network. A blockchain network may be a decentralized and distributed system that hosts distributed ledgers and/or blockchains among a set of computer nodes that may record transactions efficiently and in a verifiable and permanent way. The distributed ledgers may comprise blocks of blockchain transactions or records and other information pertinent to the blocks. Each block may contain a cryptographic hash of the previous block and/or a pointer comprising an indication of the previous block, thereby creating a chain of blocks. The pointer may be an address of the previous block and/or a hash pointer comprising a hash of the data inside the previous block. The distributed ledger may create a permanent and unalterable electronic ledger of all transactions that have been written to the ledger since its inception. Examples of popular distributed network systems include Ethereum, Eris, Multichain, Bitcoin, Litecoin, Hyperledger Fabric, Credo Blockchain, and Hyperledger Corda. Workflow management systems, as described herein, may store data related to workflows in a distributed ledger in a distributed network system, thereby reducing the possibility of threats posed by malicious parties.

A workflow management system may use encryption keys of the workflow step performers to verify completion of workflow steps assigned to the workflow step performers. Encryption keys may be uniquely identified and linked to the owner of the encryption keys. Encryption keys may use pairs of keys: (i) public keys which may be disseminated widely, and (ii) private keys which are known only to the owner of the key. Encryption keys also may be electronic or digital signatures comprising a cryptographic mechanism to identify the owners of the signatures.

The workflow step performers may validate the completion of workflow steps assigned to them by executing blockchain transactions that are recorded in the distributed ledger of the distributed network system. A blockchain transaction validating completion of a workflow step may be associated with a cryptographic signature unique to the workflow step performer assigned to the workflow step. The cryptographic signature may be generated using a private key of the workflow step performer. The workflow management system may store public keys of various workflow step performers associated with the workflows managed by the system. The workflow management system may use the public key of the workflow step performer to verify transactions associated with the cryptographic signature. Verifications of the completion of the workflow steps using encryption keys of the workflow step assigned to the workflow steps may prevent malicious parties or workflow step performer not assigned to the workflow steps manipulating data related to the workflow steps, such as indicating the status of a workflow step as complete even though the step has not been performed. A workflow management system may use encryption keys of a workflow step performer assigned to the last workflow step in a workflow to verify the completion of the workflow.

Workflow step performers may use an error code and/or error hash to indicate failure to complete workflow steps assigned to the workflow step performers. The error code and/or error hash may include an alphanumeric string and/or binary data. The workflow step performers may indicate their failure to complete workflow steps assigned to them by executing blockchain transactions that are recorded in the distributed ledger of the distributed network system. Such blockchain transactions may comprise an error code and/or error hash unique to the workflow step performer or the workflow management system. Workflow management may use the error code to verify the failed nature of the workflow step. After identifying a failed workflow step, the workflow management system may restart the workflow by identifying the last workflow step that was successfully completed, identifying one or more next workflow steps where the last successfully completed workflow step is prerequisite to the one or next workflow steps, and sending a message to workflow step performers assigned to the one or more next workflow steps to begin activities associated with the one or more next workflow steps.

Workflow management systems, as described herein, may also use smart contracts stored in the distributed network system to manage workflows. A smart contract may be computer code run by a computer node in the distributed network system. The computer code for the smart contract may contain a set of rules under which the parties to that smart contract agree to interact with each other. When the pre-defined rules are met, the agreement may be automatically enforced. A smart contract may also provide a storage mechanism for storing data related to the smart contract. A smart contract may be associated with a smart contract address. The smart contract address may be a unique identifier for a smart contract stored using a blockchain network. In many embodiments, a smart contract address includes an alphanumeric string beginning with the characters "0x".

A workflow management system may create a smart contract to execute a task. The smart contract may comprise a workflow, including one or more workflow steps needed to execute the task. Each workflow step in the smart contract may be assigned to one or more work step performers. The smart contract may comprise rules to verify completion of workflow steps assigned to the workflow step performers. A workflow step performer may validate the completion of a workflow step assigned to the workflow step performer by sending a message comprising a cryptographic signature unique to the workflow step performer. The cryptographic signature may be generated using a private key of the workflow step performer. The smart contract may comprise rules to use the public key of the workflow step performer to verify messages associated with the cryptographic signature. The smart contract use encryption keys of a workflow step performer assigned to the last workflow step in a workflow to verify the completion of the workflow. Once a workflow step is complete, the smart contract may notify the workflow step performers responsible for the next workflow steps to begin activities associated with the next workflow steps.

Workflow management systems described herein may improve the functioning of computer systems to securely manage workflow steps performed by various workflow performers in a workflow. Additionally, security may be further improved by only allowing access to a distributed ledger and/or distributed network system maintained by the workflow management system.

Workflow Management System

FIG. 1 illustrates an architectural level schematic of an environment in which a workflow management system with one or more aspects described herein may be implemented. The environment 100 includes a network 140, a distributed network system 120 (such as a blockchain network), a workflow management system 130, one or more task requester devices 110 requesting execution of various tasks to the workflow management system 130, and a plurality of workflow step performers 150. The workflow step performers 150 may be connected to the workflow management system 130 through the network 140. The workflow step performers may also be computing devices assigned to perform workflow steps by the workflow management system 130. The distributed network system 120 and the task requester devices 110 requesting execution of various tasks to the workflow management system 130 may also be connected to the workflow management system 130 through the network 140.

The communications between the workflow management system 130, the task requester devices 110, the distributed network system 120 and the workflow step performers 150 may occur over a variety of network 140, e.g., private networks, VPN, or Internet, and may use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. Some of the communications may be encrypted. The network 140 may be a LAN (local area network), a WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, 5G and WiMAX. Additionally, a variety of authorization and authentication techniques, such as username/password, Open Authorization (OAuth), Kerberos, SecureID, digital certificates, and more, may be used to secure the communications. It will be appreciated that the network connections shown in the environment 100 are illustrative, and any means of establishing a communications link between the computers may be used. Any of the devices and systems described herein may be implemented, in whole or in part, using one or more computing systems described with respect to FIG. 2. The data transferred to and from various computing devices in the environment 100 may include secure and sensitive data, such as confidential documents, customer personally identifiable information, and account data. Therefore, it may be desirable to protect the transmissions of such data using secure network protocols and encryption, and/or to protect the integrity of the data when stored on the various computing devices.

The distributed network system 120 may comprise a plurality of nodes that store, modify distributed ledgers, and/or execute smart contracts as described herein. A distributed network system may be publicly accessible and/or have restricted access. Access to a distributed network system may be limited to a particular workflow management system and a plurality of workflow step performers. The distributed network system 120 may comprise one or more distributed ledgers. The distributed ledgers may be replicated among the nodes in the distributed network system 120. Blockchain transactions or records are time-stamped and bundled into blocks where each block is identified by its cryptographic hash called the consensus proof. The consensus proof may be determined by performing complex cryptographic computations with a consensus algorithm. One skilled in the art would appreciate that, in an implementation, the consensus proof may be determined by any consensus algorithm. The distributed ledger data structure may be a mutation-resistant and durable data structure that maintains records of the blockchain transactions that are tamper-resistant. Once a blockchain transaction is recorded in a block, it cannot be altered or deleted.

The workflow management system 130 may create and monitor workflows on the distributed network system 120 to execute tasks requested by the task requester device 110. Some or all of the data related to the workflows described herein may be stored using one or more databases in the workflow management system 130. Databases may include but are not limited to relational databases, hierarchical databases, distributed databases, in-memory databases, flat file databases, XML databases, NoSQL databases, graph databases, and/or a combination thereof.

In some embodiments, one or more web services may be implemented within the various computing devices. Web services may be accessed by the devices 110 requesting execution of tasks and the workflow step performers to interact with the workflow management system 130 or execute blockchain transactions in the distributed network system 120 in the environment 100. Web services built to support a personalized display system may be cross-domain and/or cross-platform and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in front of one or more computing devices such that any external devices may communicate directly with the specialized hardware.

Figure 2:
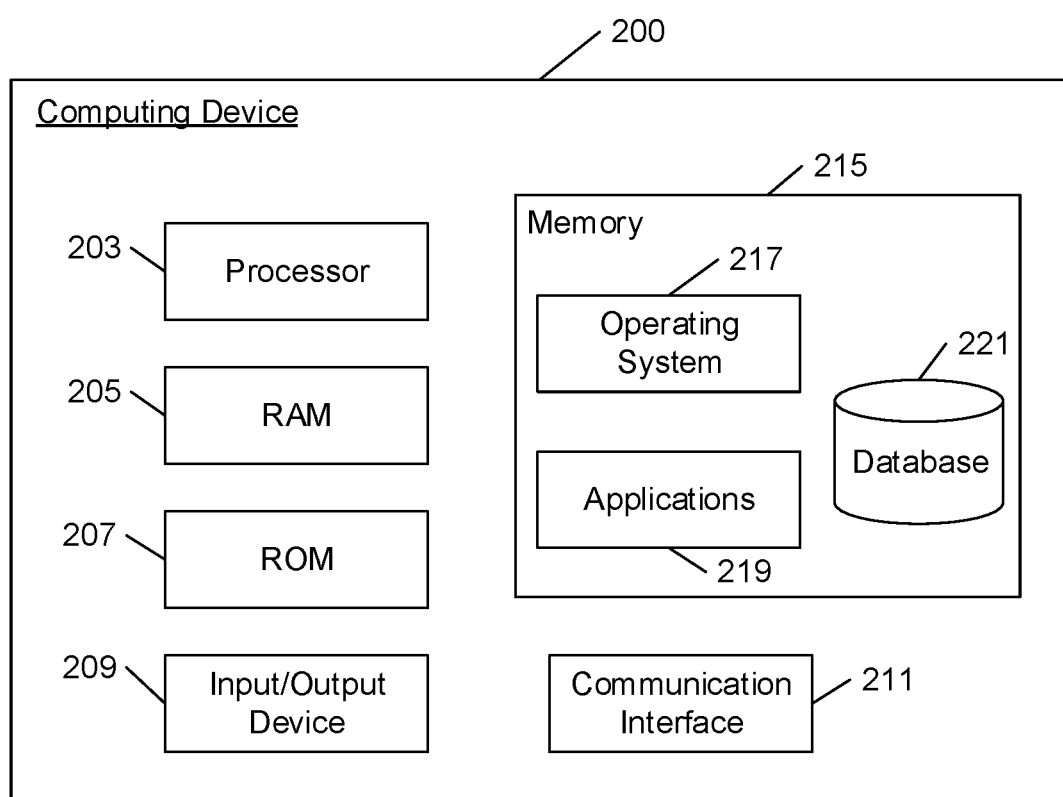
FIG. 2 shows an example computing device according to one or more aspects of the disclosure.

Turning now to FIG. 2, a computing device 200 that may be used with one or more of the computational systems is described. The computing device 200 may include a processor 203 for controlling the overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203, allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read-only memory (ROM) 207, electronically erasable programmable read-only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, the functionality of the various components may be combined and/or performed by a single component and/or multiple computing devices in communication without departing from the invention.

Figure 3:
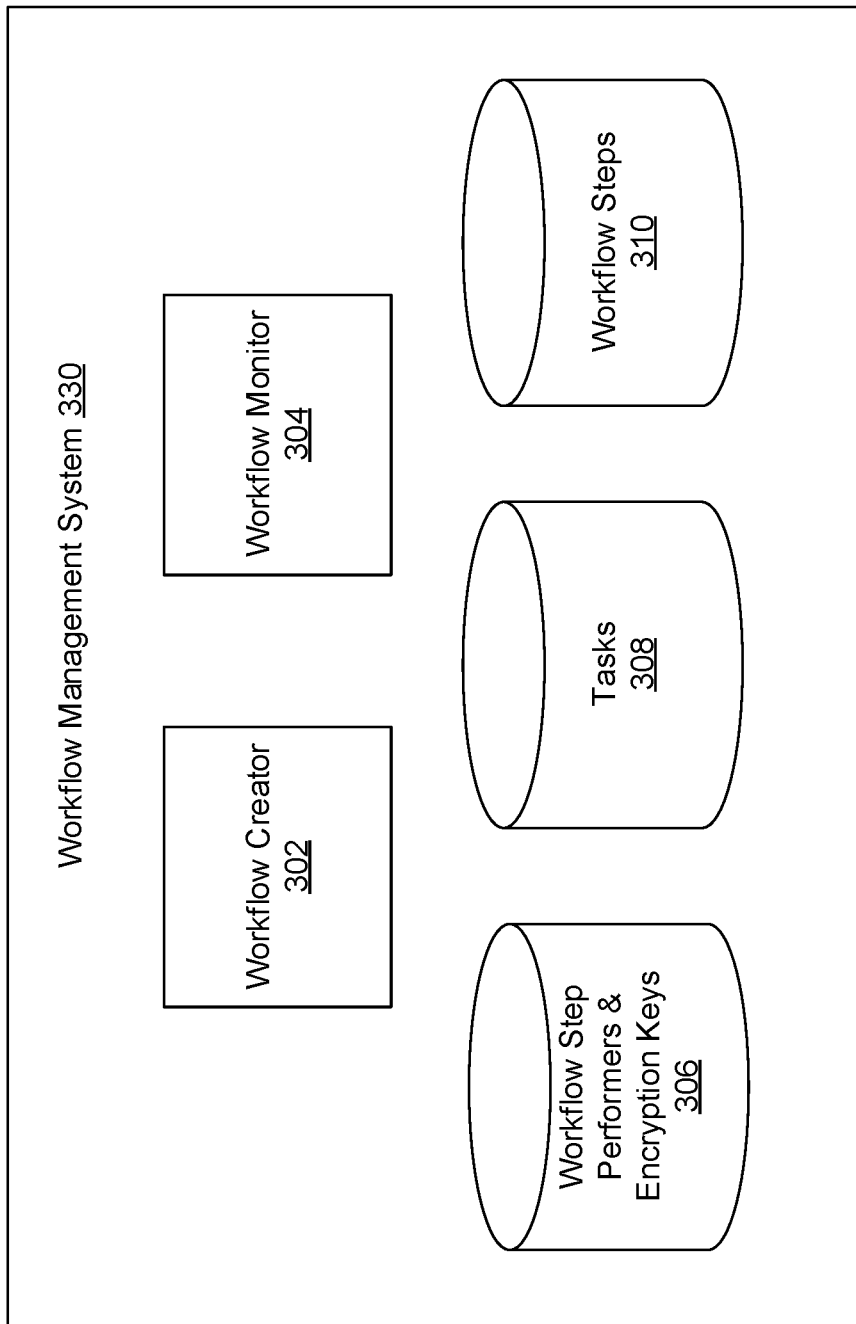
FIG. 3 shows an example of a workflow management system according to one or more aspects of the disclosure.

FIG. 3 shows an example of a workflow management system 330. The workflow management system 330 may include software components referred to herein as a workflow creator 302 and a workflow monitor 304. The workflow management system 330 may also include a tasks database 308, a workflow steps database 310 and a workflow step performers and encryption keys database 306.

The workflow creator 302 may process requests from one or more task requester devices to execute a task. The received task may be saved in the tasks database 308. The workflow creator 302 may create a workflow comprising one or more workflow steps to execute the received task. The workflow steps may be saved in the workflow steps database 310. The workflow creator 302 may also generate a smart contract comprising the workflow steps on the distributed network system. The workflow creator may assign the workflow steps to workflow step performers in the workflow step performers and encryption keys database 306.

The workflow step performers and encryption keys database 306 may contain information regarding the workflow step performers performing various workflow steps assigned by the workflow management system 330. The workflow step performers and encryption keys database 306 may also include encryption keys associated with the workflow step performers, such as the public keys of the workflow step performers. In some embodiments, the workflow step performers and encryption keys database 306 may include other optional information that might be helpful for the functionality of the workflow management system 330. The optional information may include, but is not limited to, contact information of individuals acting as workflow step performers (e.g., address, phone number, email addresses, etc.) and/or identifiers for computing devices acting as workflow step performers (e.g., MAC addresses, IP addresses, etc.). The workflow management system 330 may use the optional information to send a message to the workflow step performers of workflow steps assigned to them by the workflow management system 330.

The workflow monitor 304 may monitor the distributed ledger or the smart contracts in the distributed network system to identify blockchain transactions related to the workflows created by the workflow creator 302.

In some embodiments, the distributed ledger is used to track workflows. The workflow monitor 304 may verify completion of workflow steps by identifying transactions in a distributed ledger indicating the completion of the workflow steps and validated by cryptographic signature generated using encryption keys of the workflow step performers assigned to the workflow steps. After identifying a completed workflow step, the workflow monitor 304 may identify one or more next workflow steps where the successfully completed workflow step is prerequisite to the one or next workflow steps. The workflow monitor may send messages to workflow step performers assigned to the one or more next workflow steps to begin activities associated with the one or more next workflow steps.

The workflow monitor 304 may also verify completion of a workflow by identifying a transaction in the distributed ledger indicating the completion of the last workflow step of the workflow where the transaction is validated by a cryptographic signature generated using encryption keys of the workflow step performers assigned to the last workflow step.

In some embodiments, smart contracts are used to track workflows. The workflow monitor 304 may verify completion of workflow steps in the smart contract where the smart contract validates the completion by verifying the cryptographic signature generated using encryption keys of the workflow step performers assigned to the workflow steps. The workflow monitor 304 may also verify completion of a workflow by identifying a transaction in a distributed ledger indicating the completion of the last workflow step of the workflow where the transaction is validated by cryptographic signature generated using encryption keys of the workflow step performers assigned to the last workflow step.

The workflow monitor 304 may also verify the failed nature of the workflow step by identifying a blockchain transaction indicating a failure to complete the workflow step. The workflow monitor may validate the blockchain transactions by verifying the cryptographic signature associated with the transaction. The cryptographic signature may be generated using an error code and/or error hash unique to the workflow step performer assigned to the failed workflow step or the workflow management system.

Workflow Management Using Smart Contracts

Figure 4:
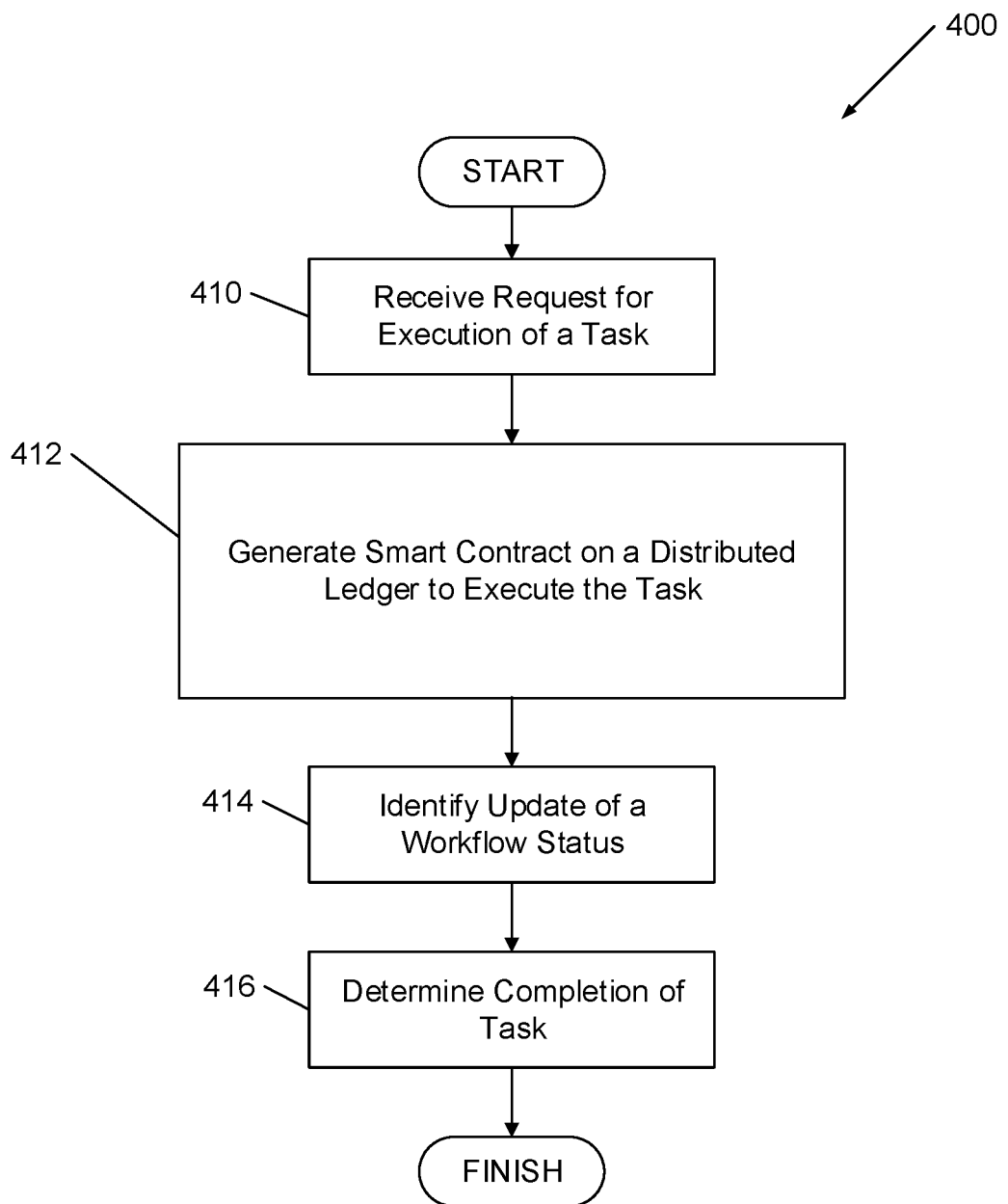
FIG. 4 shows a flowchart of a process for creating and monitoring a workflow using smart contracts according to one or more aspects of the disclosure.

FIG. 4 shows a flowchart of a process for creating and monitoring a workflow using smart contracts by the workflow management system according to one or more aspects of the disclosure. Some or all of the steps of the flowchart 400 may be performed using one or more computing devices as described herein. In some embodiments, the actions in the flowchart may be performed in different orders and with different, fewer, or additional actions than those illustrated in FIG. 4. Multiple actions may be combined and/or divided into sub-actions in some implementations.

The flowchart 400 begins at step 410, where the workflow management system may receive request data from one of the task requester devices to execute a task. The request data may identify a request to execute one or more task. The request data may be generated and/or transmitted by the computing device. The request data may also indicate any information pertinent for the execution of a task. For example, a merchant requesting a task to deliver goods to a customer may include a delivery address for the customer.

At step 412, the workflow management system may generate a smart contract to execute the task. The workflow management system may provide the code for the software components in the smart contract. The workflow management system may compile the code for the smart contract into bytecode and application interfaces. Bytecode may be a form of instruction set designed for efficient execution by a software interpreter in the blockchain network. The application interfaces may comprise public functions declared in the smart contract. The workflow management system may create a new instance of the smart contract and executes a blockchain transaction comprising the new instance. The executed blockchain transaction may be broadcasted to nodes in the blockchain network to be mined and included in the blockchain network. The smart contract may be available at a smart contract address determined by a node in the blockchain network mining the smart contract. A workflow step performer may invoke software components of the smart contract through the application interface by executing blockchain transactions addressed to the smart contract address. In many embodiments, a smart contract address includes an alphanumeric string beginning with the characters "0x". The workflow management system may store a mapping of the task to a smart contract address.

A smart contract created by the workflow management system to execute the received task may comprise a workflow, including a plurality of workflow steps where each workflow step is assigned to at least one workflow step performer. Each workflow step may be associated with a status indicating whether the workflow step is complete, incomplete, or has failed to be completed. The smart contract may comprise other information pertinent to the execution of the tasks, such as contact information and/or encryption keys of workflow step performers assigned to the various workflow steps in the workflow.

Figure 6:
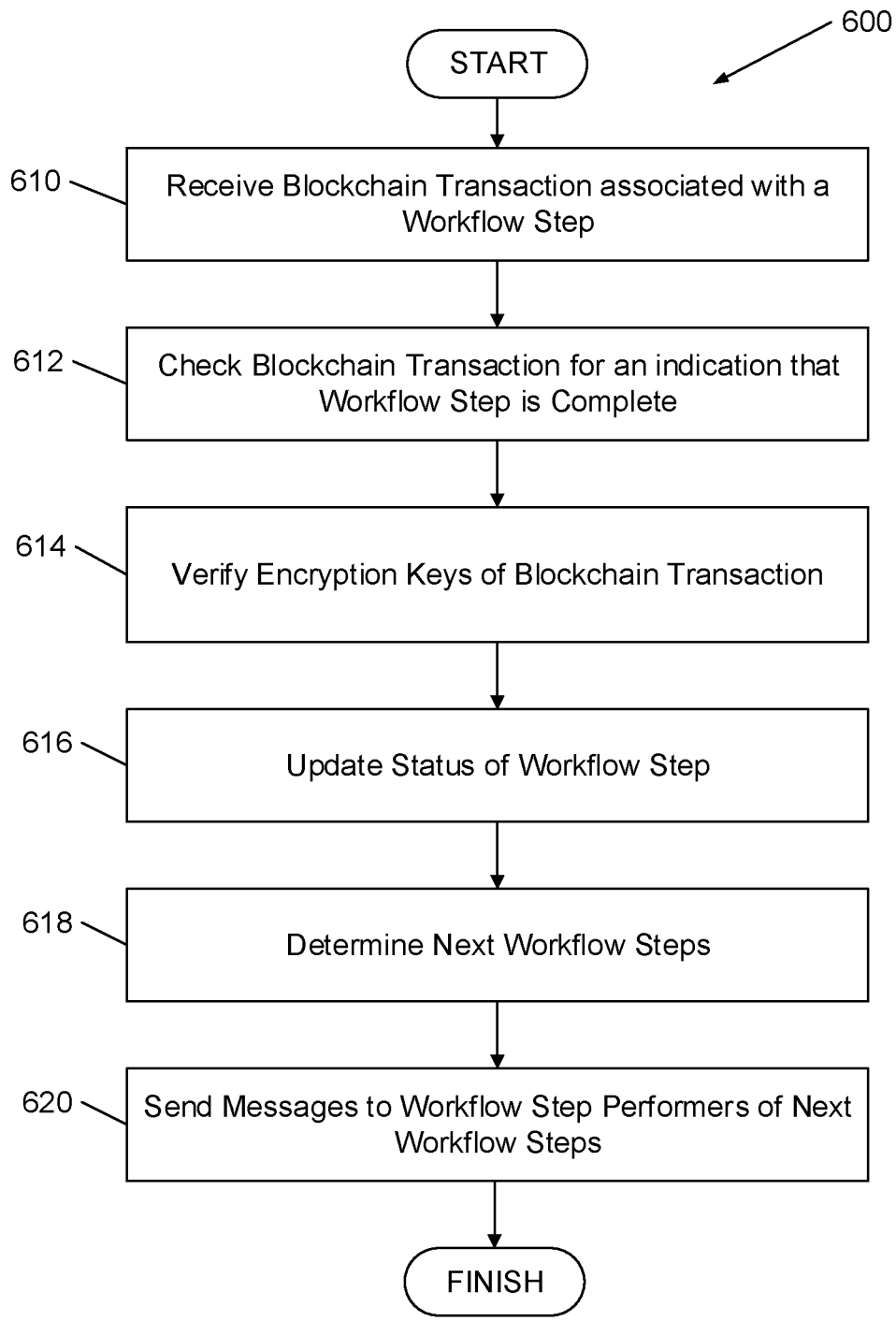
FIG. 6 shows a flowchart of processing completion of a workflow step in a workflow using smart contracts according to one or more aspects of the disclosure.

At step 414, the workflow management system may identify an updated status of the workflow step, indicating that the workflow step is complete as described in more details with respect to FIG. 6. The updated status may be identified while monitoring a smart contract. The updated status may be validated by a blockchain transaction executed by the workflow step performer assigned to the workflow step. The blockchain transaction may be associated with the encryption keys of the workflow step performer assigned to the workflow step.

At step 416, the workflow management system may determine the completion of the execution of the task. The completion of the smart contract may be determined while monitoring a smart contract. A variety of processes for determining the completion of the execution of a task are described in more details with respect to FIG. 7. The execution of the task may be complete if the status of the last workflow step is complete, and the status is validated by the blockchain transaction executed by the workflow step performer assigned to the last workflow step. The completion of the execution of the task may be further verified if all the workflow steps are complete.

Figure 5:
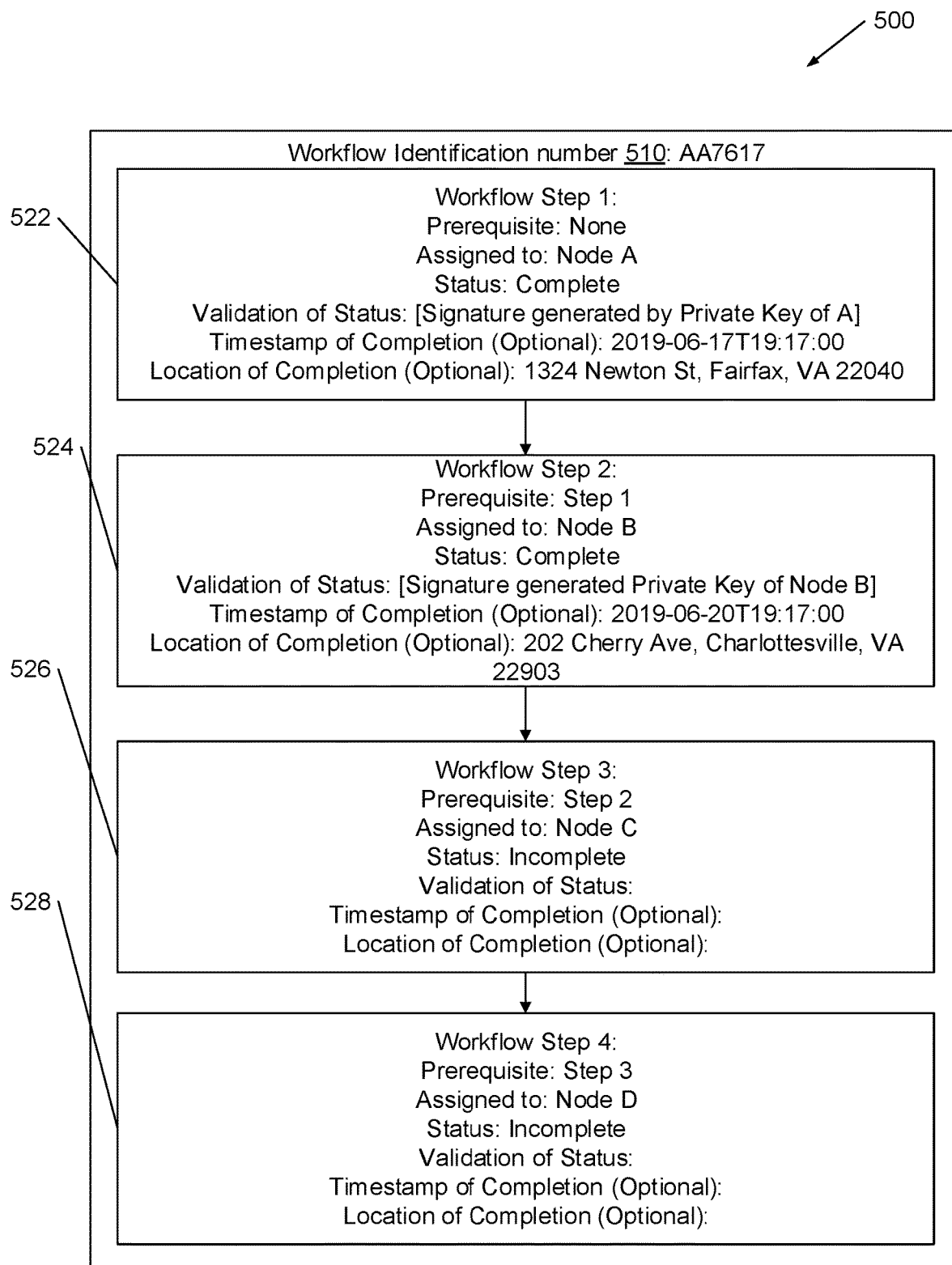
FIG. 5 shows an example of a workflow according to one or more aspects of the disclosure.

FIG. 5 shows an example of a workflow 500 that may be created by the workflow management system in a smart contract. Each workflow may be associated with a workflow identification number 510. The workflow 500 comprises four workflow steps: a workflow step 1 522 assigned to a workflow step performer Node A, a workflow step 2 524 assigned to a workflow step performer Node B, a workflow step 3 526 assigned to a workflow step performer Node C, and a workflow step 4 528 assigned to a workflow step performer Node D. Each workflow step may be associated with a workflow step identification number, such as workflow step 1, 2, 3 and 4. Workflow step 1 522 is a prerequisite to the workflow step 2 524. Workflow step 2 524 is a prerequisite to the workflow step 3 526. Workflow step 3 526 is a prerequisite to the workflow step 4 528. The workflow step 4 528 is the last workflow step of workflow 500. Each workflow step further indicates whether a workflow step is complete, incomplete, or has failed to be complete. If the workflow step is complete, the workflow step might further comprise a cryptographic signature validating the completion of the workflow step where the cryptographic signature is generated by the encryption keys of the workflow step performer assigned to the workflow. The workflow step may comprise a timestamp indicating a time and a date when the workflow step was completed and a location where the workflow step was completed.

The smart contract generated by the workflow management system may further comprise rules or instructions to process completion of workflow steps in a workflow as illustrated by the flowchart 600 in FIG. 6. Some or all of the steps of the flowchart 600 may be performed using the smart contract as described herein. In some embodiments, the actions in the flowchart may be performed in different orders and with different, fewer, or additional actions than those illustrated in FIG. 6. Actions may be combined and/or divided into sub-actions in some implementations.

At step 610, a smart contract may receive a blockchain transaction from a workflow step performer assigned to a workflow step. The blockchain transaction may comprise multiple data fields. The data fields may comprise a workflow identification number identifying a workflow being monitored by the workflow management system. The data fields may also comprise a workflow step identification number identifying a specific workflow step in the workflow with the above workflow identification number. The data fields may indicate the status of the specific workflow step. The status of the workflow step may be complete, incomplete, or has failed to be completed The blockchain transaction may further comprise a timestamp indicating a time and a date when the workflow step was completed and a location where the workflow step was completed. The blockchain transaction may comprise a cryptographic signature of the workflow step performer by whom the blockchain transaction was executed. The workflow identification number, the workflow step identification number, the location, the time, the data, and/or the status may be stored in the data fields as alphanumeric strings and/or binary data.

At step 612, the smart contract may verify that the workflow step is complete by determining that the blockchain transaction comprises an indication that the workflow step is complete. In some embodiments, the blockchain transaction may comprise a data field indicating the status of the workflow step, and the status may indicate that the workflow step is complete. If the blockchain transaction does not indicate that the workflow step is complete, the smart contract may not update the status of the workflow step in the workflow or may indicate that the workflow step performer has failed to complete the workflow step.

At step 614, the smart contract may verify that the blockchain transaction includes a cryptographic signature generated by the encryption keys associated with the workflow step performer assigned to the specific workflow step. The smart contract may determine whether the cryptographic signature can be decrypted by encryption keys or public keys associated with the workflow step performers. If the verification of the cryptographic signature fails, the smart contract may not update the status of the workflow step in the workflow or may indicate that the workflow step performer has failed to complete the workflow step.

At step 616, the smart contract may update the status of the workflow step in the smart contract to indicate that the workflow step is complete. The status of the workflow step may be updated after verifying that the workflow step is the blockchain transaction indicates that the workflow step is complete and/or when the cryptographic signature in the blockchain transaction is verified.

At step 618, after determining that a workflow step is complete, the smart contract may determine one or more next workflow steps from the workflow where the completed workflow step is a prerequisite to the one or more next workflow steps. For example, as shown in FIG. 5, the workflow step 2 526 is complete. As the workflow step 2 526 is complete, the smart contract may determine that the next workflow step is the workflow step 3 528, where the workflow step 2 526 is a prerequisite for the workflow step 3 528.

At step 620, the smart contract may send a message to workflow step performers assigned to the one or more next workflow steps to begin activities associated with the one or more next workflow steps. The message may be a text message, an email, and/or a pop-up notification in a computing device instructing the workflow step performers assigned to the next workflow steps to begin activities associated with the next workflow steps. The message may also comprise executable code and/or instruction sets that when executed by the workflow step performers assigned to the next workflow steps, cause the workflow step performers to perform activities associated with the next workflow steps. The message may store the executable code and/or instruction sets in various forms of objects and templates.

Figure 7:
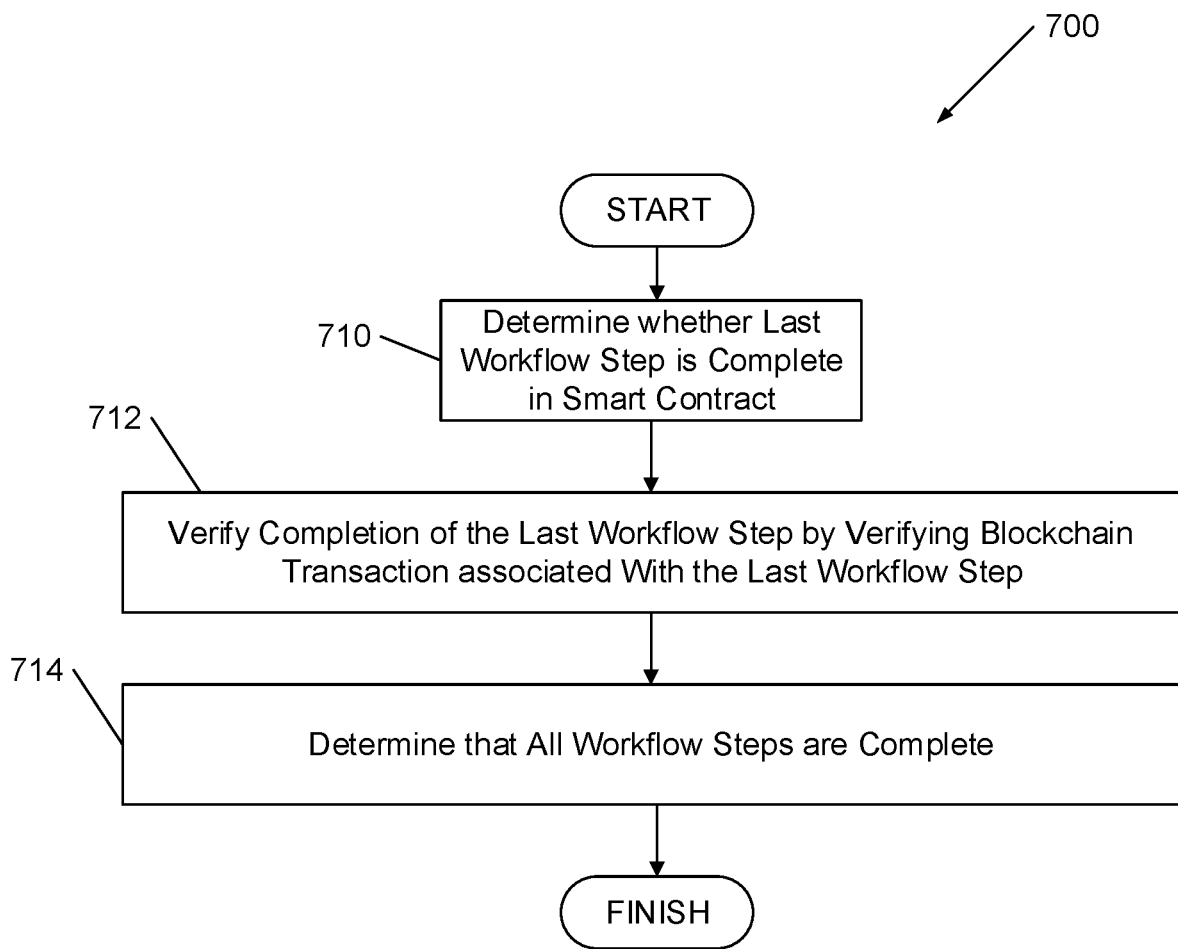
FIG. 7 shows a flowchart of processing completion of a workflow using smart contracts according to one or more aspects of the disclosure.

FIG. 7 shows a flowchart 700 of processing completion of a workflow using smart contracts according to one or more aspects of the disclosure. Some or all of the steps of the flow chat 700 may be performed using the workflow management system as described herein. In some embodiments, the actions in the flowchart may be performed in different orders and with different, fewer, or additional actions than those illustrated in FIG. 7. Actions may be combined and/or divided into sub-actions in some implementations.

At step 710, the workflow management system may determine whether the status of the last workflow step in the workflow for executing the task indicates whether the last workflow step is complete. For example, for the example workflow 500 shown in FIG. 5, the workflow management system may determine whether the last workflow step, the workflow step 4 528, is complete. The workflow management system may check the status of the last workflow step in order to determine if the last workflow step is complete. If the last workflow step is not complete, the workflow management system may determine that the execution of the workflow is incomplete.

At step 712, the workflow management system may verify the blockchain transaction validating the status of the last workflow step. The workflow management system may verify the blockchain transaction by verifying that the blockchain transaction has been executed by a workflow step performer assigned to the last workflow step and comprises a cryptographic signature associated with encryption keys of the at least one workflow step performer assigned to the last workflow step. The workflow management system may determine whether the cryptographic signature can be decrypted by encryption keys or public keys associated with the at least one workflow step performer assigned to the last workflow step. If the verification of the cryptographic signature fails, the workflow management system may determine that the execution of the workflow is incomplete.

At step 714, the workflow management system may determine whether all the workflow steps have been completed. For example, for the example workflow 500 shown in FIG. 5, The workflow management system may determine whether the all the workflow steps in the workflow 500 (i.e., the workflow step 1 522, the workflow step 2 524, the workflow step 3 526 and the workflow step 4 528) are complete. The workflow management system may check the statuses of all the workflow steps in order to determine if the workflow steps are complete. If all the workflow steps are not complete, the workflow management system may determine that the execution of the workflow is incomplete. The workflow management system may determine that a workflow is complete if the status of the last workflow step is complete, and the status is validated by the blockchain transaction. In some embodiments, the workflow management system may determine a workflow is complete if the status of the last workflow step is complete and the status is validated by the blockchain transaction, and all the workflow steps are complete.

Workflow Management Using Distributed Ledgers

Figure 8:
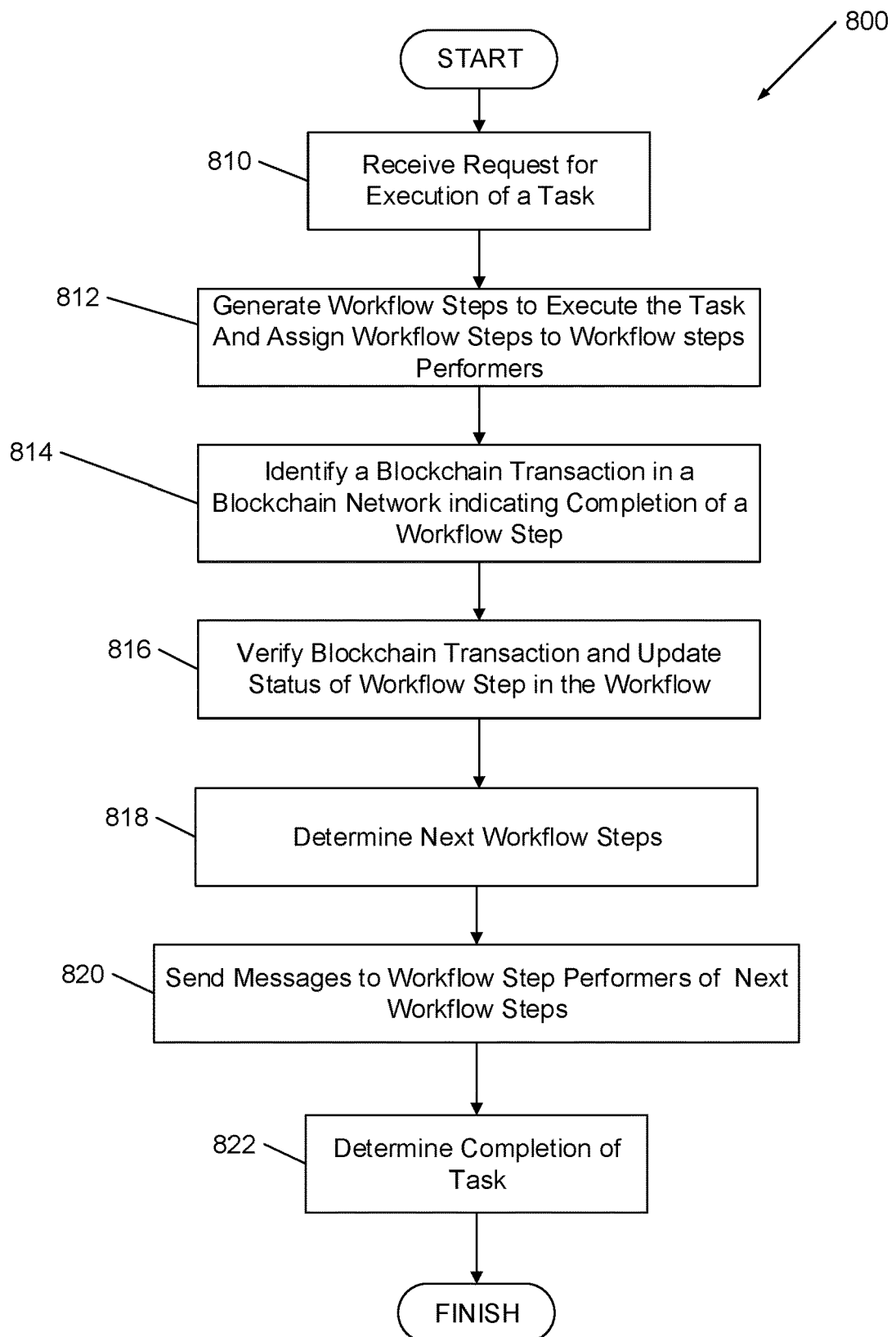
FIG. 8 shows a flowchart of a process for creating and monitoring a workflow using distributed ledgers according to one or more aspects of the disclosure.

FIG. 8 shows a flowchart 800 of a process for creating and monitoring a workflow using distributed ledgers in a distributed network system by a workflow management system according to one or more aspects of the disclosure. Some or all of the steps of the flowchart 800 may be performed using one or more computing devices as described herein. In some embodiments, the actions in the flowchart may be performed in different orders and with different, fewer, or additional actions than those illustrated in FIG. 8. Actions may be combined and/or divided into sub-actions in some implementations.

The flowchart 800 begins at step 810, where the workflow management system may receive request data from a task requester device to execute a task. The request data may identify a request to execute one or more task. The request data may be generated and/or transmitted by the computing device. The request data may also indicate any information pertinent for the execution of a task. For example, a merchant requesting a task to deliver goods to a customer may include a delivery address for the customer.

At step 812, the workflow management system may create a workflow to manage the execution of the task. The workflow may comprise a plurality of workflow steps. Each workflow step may be assigned to at least one workflow step performer. Each workflow step may be associated with a status indicating whether the workflow step is complete, incomplete, or has failed to be completed. The workflow may comprise other information pertinent to the execution of the tasks, such as contact information and/or encryption keys of workflow step performers assigned to the various workflow steps in the workflow. The workflow steps may be saved in a database of the workflow management system. The workflow management system may send a message to workflow step performers assigned to the first workflow step to begin activities associated with the first workflow step. The message may be a text message, an email and/or a pop up notification in a computing device instructing the workflow step performers assigned to the next workflow steps to begin activities associated with the next workflow steps. The message may also comprise executable code and/or instruction sets that when executed by the workflow step performers assigned to the next workflow steps, cause the workflow step performers to perform activities associated with the next workflow steps.

At step 814, the workflow management system may identify, from a distributed ledger hosted on the set of computer nodes of the distributed network system, one or more blockchain transactions. The blockchain transactions may be related to the workflow steps created at step 812. One of the blockchain transactions may comprise an indication of completion of a specific workflow step from the plurality of workflow steps in the workflow. The said blockchain transaction may comprise multiple data fields. The data fields may comprise a workflow identification number identifying the workflow and a workflow step identification number identifying a specific workflow step in the workflow. One of the data fields may comprise the status of the specific workflow, indicating that the workflow step is complete. The blockchain transaction may further comprise a timestamp indicating a time and a date when the workflow step was completed and a location where the workflow step was completed. The blockchain transaction may comprise a cryptographic signature of the workflow step performer by whom the blockchain transaction was executed. The workflow identification number, the workflow step identification number, the location, the time, the data, and/or the status may be stored in the data fields as alphanumeric strings and/or binary data.

The blockchain transaction may be executed by the workflow step performer assigned to the workflow step. The blockchain transaction may be associated with encryption keys of the at least one workflow step performer assigned to the workflow step.

At step 816, the workflow management system may verify that the workflow step is complete through the specific blockchain transaction. The workflow management system may verify the status of the specific workflow step by determining that the blockchain transaction comprises an indication that the workflow step is complete and that the blockchain transaction includes a cryptographic signature generated by the encryption keys associated with the workflow step performer assigned to the specific workflow step. The workflow management system may determine whether the cryptographic signature can be decrypted by encryption keys or public keys associated with the workflow step performers. If the blockchain transaction does not comprise an indication that the workflow step is complete or the verification of the cryptographic signature fails, the workflow management system may not update the status of the workflow step in the workflow or may indicate that the workflow step performer has failed to complete the workflow step. After verifying that the workflow step is complete, the workflow management system may update the status of the workflow step in the workflow to indicate that the workflow step is complete.

At step 818, after determining that a workflow step is complete, the workflow management system may determine one or more next workflow steps where the completed workflow step is a prerequisite to the one or more next workflow steps. For example, as shown in FIG. 5, the workflow step 2 526 is complete. As the workflow step 2 526 is complete, the smart contract may determine that the next workflow step is the workflow step 3 528, where the workflow step 2 526 is a prerequisite for the workflow step 3 528.

At step 820, the workflow management system may send a message to workflow step performers assigned to the one or more next workflow steps to begin activities associated with the one or more next workflow steps. The workflow management system may use the contact information saved in the workflow step performers and encryption key database for the workflow step performers to send the message. The message may be a text message, an email and/or a pop-up notification in a computing device instructing the workflow step performers assigned to the next workflow steps to begin activities associated with the next workflow steps. The message may also comprise executable code and/or instruction sets that when executed by the workflow step performers assigned to the next workflow steps, cause the workflow step performers to perform activities associated with the next workflow steps.

At step 822, the workflow management system may determine the completion of the execution of the task. A variety of processes for determining the completion of the execution of a task are described in more details with respect to FIG. 9. The execution of the task may be complete if the status of the last workflow step of the workflow is complete, and the status is validated by the blockchain transaction executed by the workflow step performer assigned to the last workflow step. The completion of the execution of the task may be further verified if all the workflow steps of the workflow are complete.

Figure 9:
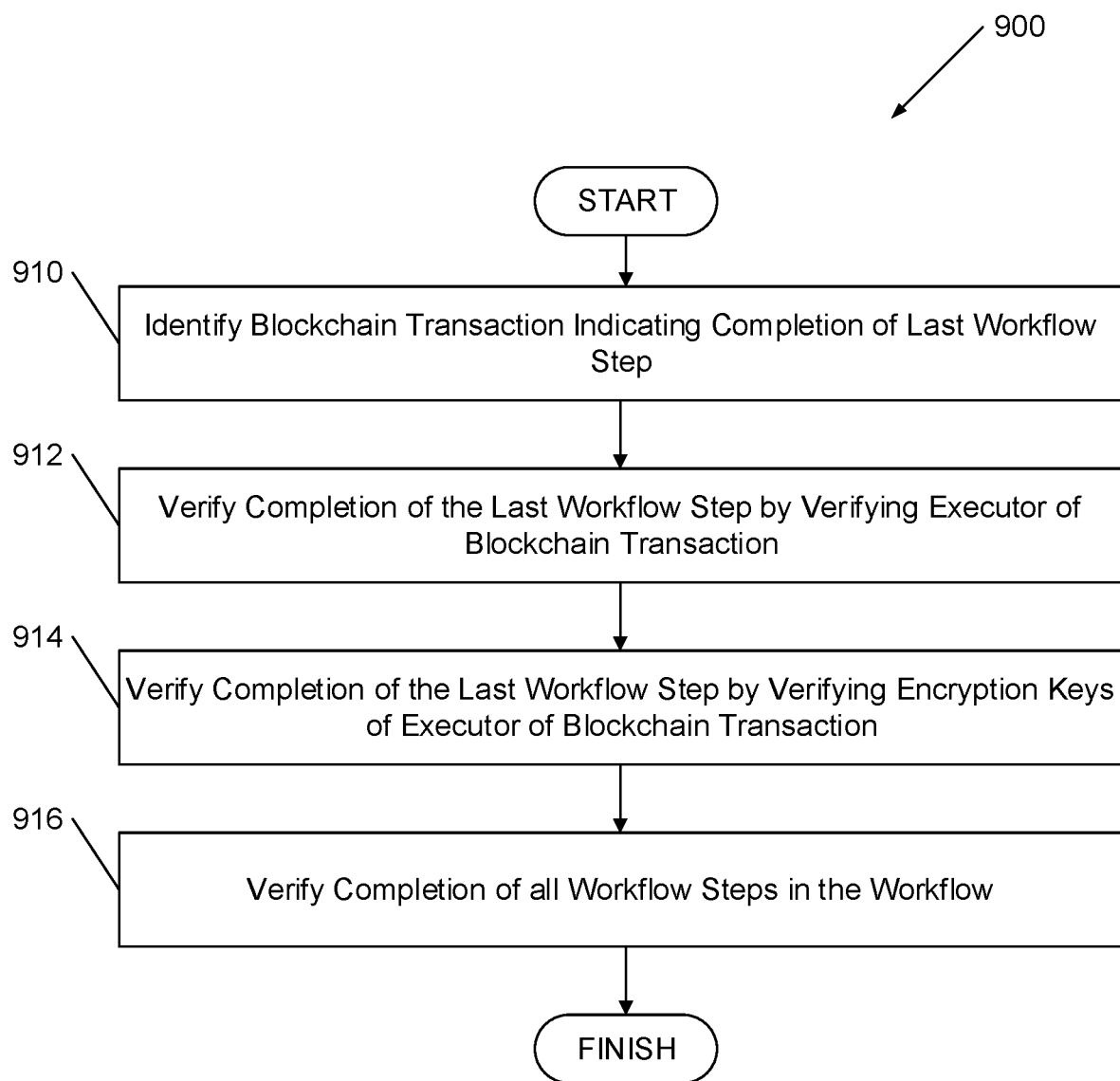
FIG. 9 shows a flowchart of processing completion of a workflow step in a workflow using distributed ledger according to one or more aspects of the disclosure.

FIG. 9 shows a flowchart 900 for determining the completion of the execution of a task by the workflow management system. Some or all of the steps of the flowchart 900 may be performed using the workflow management system as described herein. In some embodiments, the actions in the flowchart may be performed in different orders and with different, fewer, or additional actions than those illustrated in FIG. 9. Actions may be combined and/or divided into sub-actions in some implementations.

At step 910, the workflow management system may determine whether the status of the last workflow step in the workflow for executing the task indicates whether the last workflow step is complete. For example, for the example workflow 500 shown in FIG. 5, the workflow management system may determine whether the last workflow step, the workflow step 4 528, is complete. The workflow management system may check the status of the last workflow step in order to determine if the last workflow step is complete. If the last workflow step is not complete, the workflow management system may determine that the execution of the workflow is incomplete.

At step 912, the workflow management system may determine that the blockchain transaction is executed by the at least one workflow step performer assigned to the last workflow step. The blockchain transaction may validate the status of the last workflow step. The workflow management system may store information regarding the workflow step performer assigned to the last workflow step in the workflow steps database. The workflow may verify that the workflow step performer who has executed the blockchain transaction is the listed workflow step performer assigned to the last workflow step in the workflow steps database. The workflow management system may determine whether the cryptographic signature can be decrypted by encryption keys or public keys associated with the at least one workflow step performer assigned to the last workflow step. If a workflow step performer other than the one assigned to the workflow step has executed the blockchain transaction, the workflow management system may determine that the execution of the workflow is incomplete.

At step 914, the workflow management system may determine whether the blockchain transaction comprises a cryptographic signature associated with encryption keys of the at least one workflow step performer assigned to the last workflow step. The workflow management system may determine whether the cryptographic signature can be decrypted by encryption keys or public keys associated with the at least one workflow step performer assigned to the last workflow step. If the verification of the cryptographic signature fails, the workflow management system may determine that the execution of the workflow is incomplete.

At step 916, the workflow management system may determine whether all the workflow steps have been completed. For example, for the example workflow 500 shown in FIG. 5, The workflow management system may determine whether the all the workflow steps in the workflow 500 (i.e., the workflow step 1 522, the workflow step 2 524, the workflow step 3 526 and the workflow step 4 528) are complete. The workflow management system may check the statuses of all the workflow steps in order to determine if the workflow steps are complete. If all the workflow steps are not complete, the workflow management system may determine that the execution of the workflow is incomplete.

The workflow management system may determine that a workflow is complete if the status of the last workflow step is complete, and the status is validated by the blockchain transaction executed the by the at least one workflow step performer assigned to the last workflow step and comprises a cryptographic signature associated with encryption keys of the at least one workflow step performer assigned to the last workflow step. In some embodiments, the workflow management system may determine a workflow is complete further based on a determination of whether all the workflow steps are complete.

Failure to Complete a Workflow Step

Figure 10:
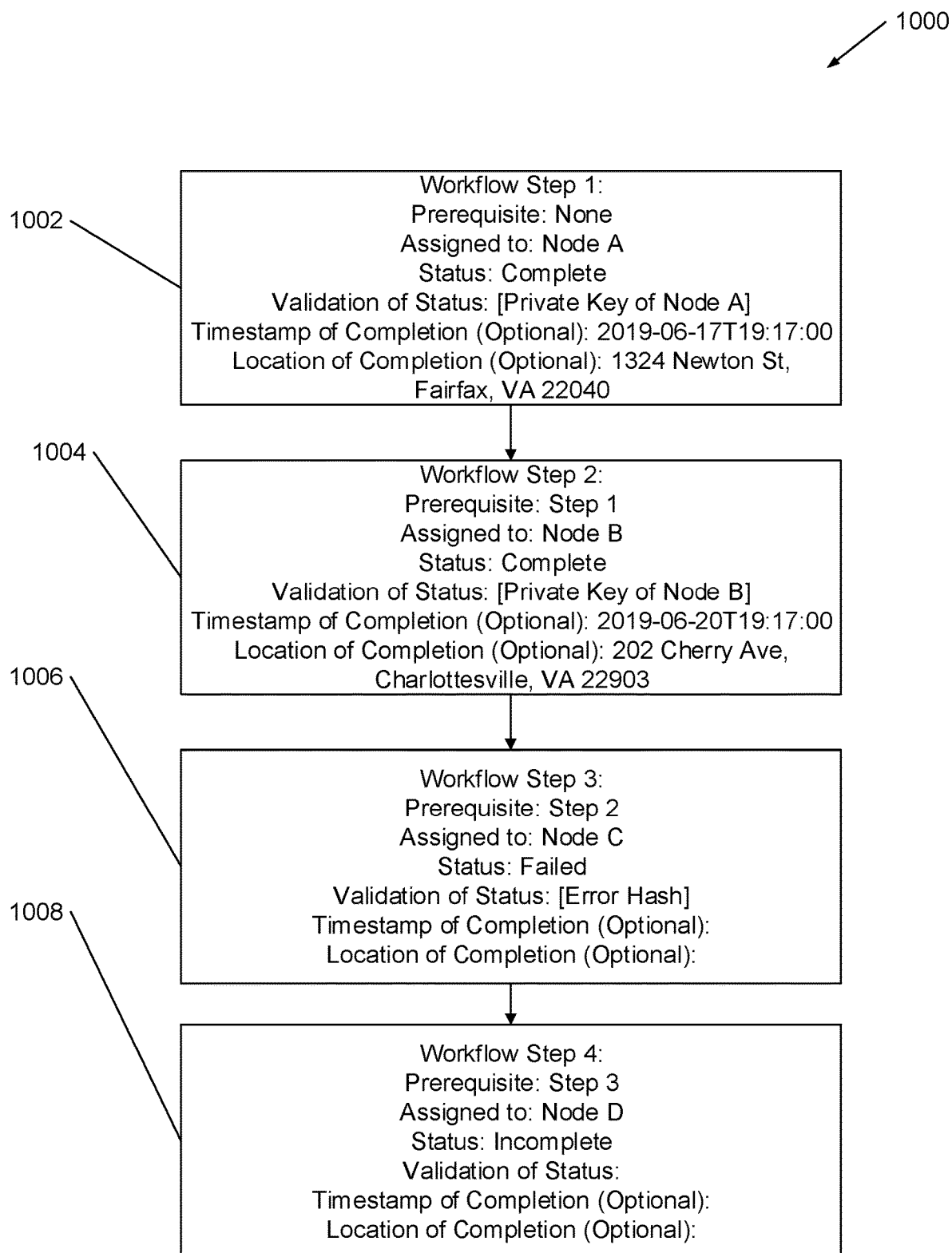
FIG. 10 shows an example of a workflow with a failed workflow step according to one or more aspects of the disclosure.

FIG. 10 shows an example of a workflow 1000 with a failed workflow step. The workflow 1000 comprises four workflow steps: a workflow step 1 1002 assigned to a workflow step performer Node A, a workflow step 1004 assigned to a workflow step performer Node B, a workflow step 3 1006 assigned to a workflow step performer Node C, and a workflow step 4 1008 assigned to a workflow step performer Node D. Workflow step 1 1002 is a prerequisite to the workflow step 2 1004. Workflow step 2 1004 is a prerequisite to the workflow step 3 1006. Workflow step 3 1006 is a prerequisite to the workflow step 4 1008. The workflow step 4 1008 is the last workflow step of workflow 1000. Each workflow step further indicates whether a workflow step is complete, incomplete, or has failed to be complete. The workflow 1 1002 and the workflow step 2 1004 are complete, and the complete statuses are validated by cryptographic signatures generated by the encryption keys of the workflow step performers assigned to the workflow step 1 1002 and the workflow step 2 1004 respectively. The workflow step 1 1002 and the workflow step 2 1004 also comprise timestamps indicating the times and the dates when the workflow steps were completed and locations where the workflow steps were completed. The workflow 1000 also comprises a failed workflow step 3 1006 and an incomplete workflow step 4 1008. The status of the failed workflow step 3 1006 is validated by an error hash. Workflow step 2 1004 is a prerequisite to the workflow step 3 1006 and is the last completed workflow step.

Figure 11:
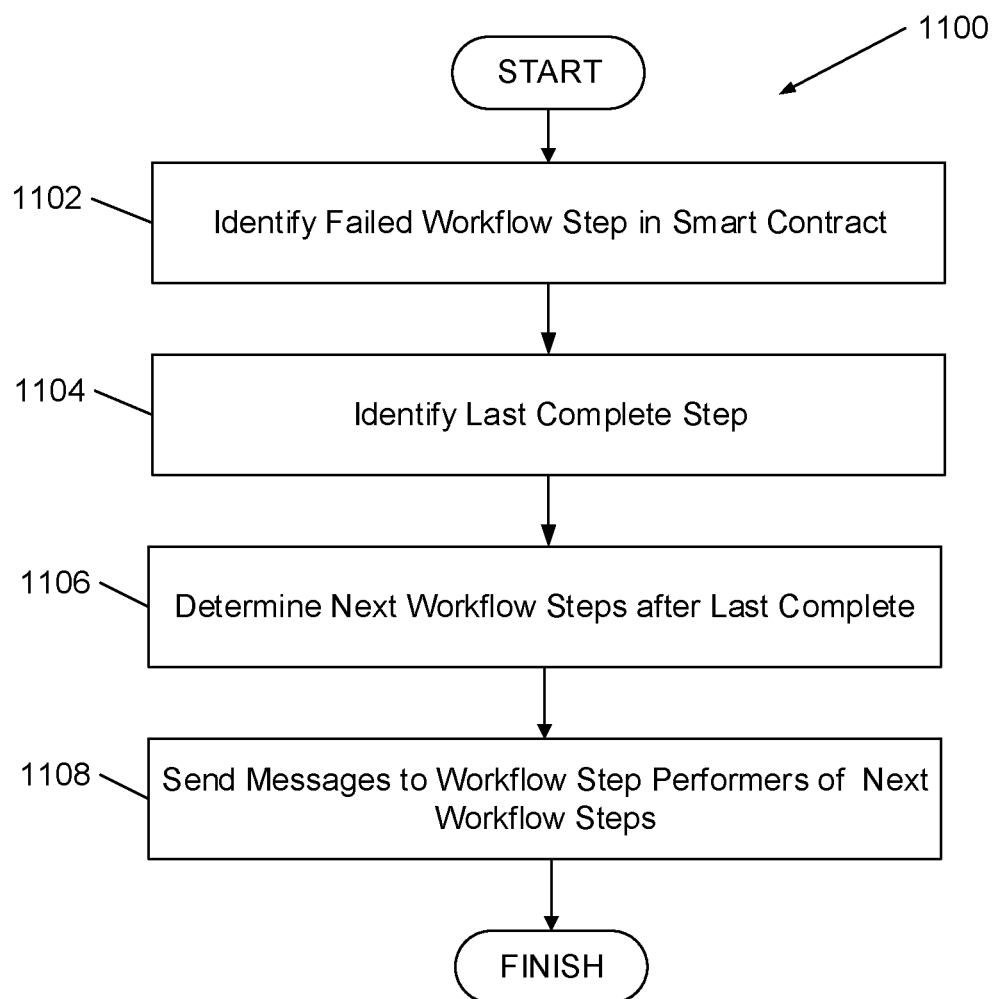
FIG. 11 shows a flowchart of processing a failed workflow step in a workflow according to one or more aspects of the disclosure.

FIG. 11 shows a flowchart 1100 of processing a failed workflow step in a workflow by a workflow management system according to one or more aspects of the disclosure. Some or all of the steps of the flowchart 1100 may be performed using one or more computing devices as described herein. In some embodiments, the actions in the flowchart may be performed in different orders and with different, fewer, or additional actions than those illustrated in FIG. 11. Actions may be combined and/or divided into sub-actions in some implementations.

The flowchart 1100 begins at step 1102 where the workflow management system may identify, from a distributed ledger hosted on the set of nodes of the distributed network system, a blockchain transaction related to a workflow step in a workflow. The workflow may be managed by a smart contract on the distributed network system or by the workflow management system. The blockchain transaction may comprise an indication of a failure to complete the workflow step. For example, the blockchain transaction may comprise multiple data fields where one of the data fields store the status of the workflow step. The status of the workflow step may indicate that the workflow step has failed to be completed. The blockchain transaction may be executed by the workflow step performer assigned to the workflow step. The blockchain transaction may be associated with an error hash.

The error hash may be associated with the workflow step performer assigned to the workflow step or may be specific to the workflow management system to indicate a failed workflow step.

At step 1104, the workflow management system may identify the last completed workflow step in the workflow comprising the failed workflow step. For example, for the failed workflow step 3 1006 in the workflow 1100 in FIG. 11, the workflow management system may determine the workflow step 2 1004 as the last completed workflow step. The workflow step 2 1004 is a prerequisite to the failed workflow step 3 1006.

At step 1106, the workflow management system may determine one or more next workflow steps where the last completed workflow step is a prerequisite to the one or more next workflow steps. For example, for the last completed workflow step 2 1004 in the workflow 1100 in FIG. 11, the workflow management system may determine the workflow step 3 1006 as the next workflow step.

At step 1108, the workflow management system may send a message to workflow step performers assigned to the next workflow steps to begin activities associated with the next workflow steps. The workflow management system may use the contact information saved in the workflow step performers and encryption keys database for the workflow step performers to send the message. The message may be a text message, an email and/or a pop-up notification in a computing device instructing the workflow step performers assigned to the next workflow steps to begin activities associated with the next workflow steps. The message may also comprise executable code and/or instruction sets that when executed by the workflow step performers assigned to the next workflow steps, cause the workflow step performers to perform activities associated with the next workflow steps. The message may store the executable code and/or instruction sets in various forms of objects and templates.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is, therefore, to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method, comprising:
maintaining, by a computing device, a registry of workflow step performers;
receiving, by the computing device, a request of an execution of a task;
generating, by the computing device, a smart contract comprising a workflow for executing the task, wherein the workflow comprises a plurality of workflow steps, and wherein each workflow step is assigned to at least one workflow step performer from the registry of workflow step performers and each workflow step comprises a status indicating whether the workflow step is complete;
identifying, by the computing device and from a workflow step in the smart contract, that a status of the workflow step indicates that the workflow step is complete, wherein the status is validated by a first blockchain transaction executed by the at least one workflow step performer assigned to the workflow step, and wherein the first blockchain transaction is associated with encryption keys of the at least one workflow step performer assigned to the workflow step;
determining, by the computing device and from the smart contract, completion of the execution of the task, wherein the determination is based on:
 a determination that a status of a last workflow step, from the plurality of workflow steps, indicates that the last workflow step is complete; and
 a determination that a second blockchain transaction, validating the status of the last workflow step and executed by the at least one workflow step performer assigned to the last workflow step, is associated with encryption keys of the at least one workflow step performer assigned to the last workflow step;
identifying, from the smart contract, a status of a workflow step, from the plurality of workflow steps, indicating a failure to complete the workflow step, wherein the status is validated by a third blockchain transaction executed by the at least one workflow step performer assigned to the workflow step, and wherein the third blockchain transaction is associated with an error hash;
identifying, from the smart contract, a last complete workflow step from the plurality of workflow steps in the workflow;
determining, from the plurality of workflow steps, one or more next workflow steps, wherein the last complete workflow step is a prerequisite to the one or more next workflow steps; and
sending a message to workflow step performers assigned to the one or more next workflow steps, from the registry of workflow step performers, to begin activities associated with the one or more next workflow steps.

2. The method of claim 1, wherein the smart contract, when executed by a node in a blockchain network, causes the node to:
- receive, from the at least one workflow step performer assigned to the workflow step, the first blockchain transaction; and
- verify that the workflow step is complete, wherein the verification is based on:
  - a determination that the first blockchain transaction comprises an indication that the workflow step is complete; and
  - a determination that the first blockchain transaction is associated with the encryption keys of the at least one workflow step performer assigned to the workflow step; and
- update, in the smart contract, the status of the workflow step to indicate that the workflow step is complete.

3. The method of claim 2, wherein the smart contract, when executed by the node of the blockchain network, cause the node to verify the encryption keys of the at least one workflow step performer assigned to the workflow step by verifying that a public key of the at least one workflow step performer decrypts the first blockchain transaction.

4. The method of claim 1, wherein the smart contract, when executed by a node of a blockchain network, cause the node to:
- determine whether a status of a current workflow step from the plurality of workflow steps indicates that the current workflow step is complete;
- determine, based on a determination that the current workflow step is complete and from the plurality of workflow steps, one or more next workflow steps, wherein the current workflow step is a prerequisite to the one or more next workflow steps; and
- send a message to workflow step performers assigned to the one or more next workflow steps, from the registry of workflow step performers, to begin activities associated with the one or more next workflow steps.

5. The method of claim 1, wherein the first blockchain transaction further comprises a timestamp indicating a time and a date for when the workflow step was completed.

6. The method of claim 1, wherein the first blockchain transaction further comprises an indication for a location where the workflow step was completed.

7. The method of claim 1, wherein determining the completion of the execution of the task is further based on determining whether each of the plurality of workflow steps is complete.

8. An apparatus, comprising:
- one or more processors; and
- memory storing instructions that, when executed by the one or more processors, cause the apparatus to:
  - maintain a registry of workflow step performers;
  - receive a request for execution of a task;
  - generate a smart contract comprising a workflow for executing the task, wherein the workflow comprises a plurality of workflow steps, and wherein each workflow step in the plurality of workflow steps is assigned to at least one workflow step performer from the registry of workflow step performers and each workflow step comprises a status indicating whether said workflow step is complete;
  - identify, from a workflow step in the smart contract, that a status of the workflow step indicates that the workflow step is complete, wherein the status is validated by a first blockchain transaction executed by the at least one workflow step performer assigned to the workflow step, and wherein the first blockchain transaction is associated with encryption keys of the at least one workflow step performer assigned to the workflow step;
  - determine, from the smart contract, completion of the execution of the task, wherein the determination is based on:
    - a determination that a status of a last workflow step, from the plurality of workflow steps, indicates that the last workflow step is complete; and
    - a determination that a second blockchain transaction, validating the status of the last workflow step is complete and executed by the at least one workflow step performer assigned to the last workflow step, is associated with encryption keys of the at least one workflow step performer assigned to the last workflow step
  - identify, from the smart contract, a status of a workflow step, from the plurality of workflow steps, indicating a failure to complete the workflow step, wherein the status is validated by a third blockchain transaction executed by the at least one workflow step performer assigned to the workflow step, and wherein the third blockchain transaction is associated with an error hash;
  - identify, from the smart contract, a last complete workflow step from the plurality of workflow steps in the workflow;
  - determine, from the plurality of workflow steps, one or more next workflow steps, wherein the last complete workflow step is prerequisite to the one or more next workflow steps; and
  - send a message to workflow step performers assigned to the one or more next workflow steps, from the registry of workflow step performers, to begin activities associated with the one or more next workflow steps.

9. The apparatus of claim 8, wherein the smart contract, that, when executed by a node in blockchain network, cause the node to:
- based on a status of a current workflow step, from the plurality of workflow steps, indicating that the current workflow step is complete:
  - determine, from the plurality of workflow steps, one or more next workflow steps, wherein the current workflow step is a prerequisite to the one or more next workflow steps; and
  - send a message, to workflow step performers assigned to the one or more next workflow steps, from the registry of workflow step performers, to begin activities associated with the one or more next workflow steps.

10. The apparatus of claim 8, wherein the smart contract that, when executed by a node in a blockchain network, cause the node to determine the completion of the execution of the task further based on determining whether each of the plurality of workflow steps is complete.

11. The apparatus of claim 8, wherein the smart contract, when executed by a node in a blockchain network, causes the node to:
- receive, from the at least one workflow step performer assigned to the workflow step, the first blockchain transaction; and
- verify that the workflow step is complete, wherein the verification is based on:
  - a determination that the first blockchain transaction comprises an indication that the workflow step is complete; and a determination that the first blockchain transaction is associated with the encryption keys of the at least one workflow step performer assigned to the workflow step; and update, in the smart contract, the status of the workflow step to indicate that the workflow step is complete.

12. The apparatus of claim 11, wherein the smart contract, when executed by the node of the blockchain network, cause the node to verify the encryption keys of the at least one workflow step performer assigned to the workflow step by verifying that a public key of the at least one workflow step performer decrypts the first blockchain transaction.

13. The apparatus of claim 8, wherein the first blockchain transaction further comprises a timestamp indicating a time and a date for when the workflow step was completed.

14. The apparatus of claim 8, wherein the first blockchain transaction further comprises an indication for a location where the workflow step was completed.

15. A non-transitory machine-readable medium storing instructions that, when executed by one or more processors, cause the one or more processors to perform steps comprising:

maintaining a registry of workflow step performers;

receiving a request for execution of a task;

generating a smart contract comprising a workflow for executing the task, wherein the workflow comprises a plurality of workflow steps, and wherein each workflow step is assigned to at least one workflow step performer from the registry of workflow step performers and each workflow step comprises a status indicating whether the workflow step is complete;

identifying, from a workflow step in the smart contract, that a status of the workflow step indicates that the workflow step is complete, wherein the status is validated by a first blockchain transaction executed by the at least one workflow step performer assigned to the workflow step, and wherein the first blockchain transaction is associated with encryption keys of the at least one workflow step performer assigned to the workflow step;

determining, from the smart contract, completion of the execution of the task, wherein the determination is based on:

a determination that a status of a last workflow step, from the plurality of workflow steps, indicates that the last workflow step is complete; and a determination that a second blockchain transaction, validating the status of the last workflow step and executed by the at least one workflow step performer assigned to the last workflow step, is associated with encryption keys of the at least one workflow step performer assigned to the last workflow step;

identifying, from the smart contract, a status of a workflow step, from the plurality of workflow steps, indicating a failure to complete the workflow step, wherein the status is validated by a third blockchain transaction executed by the at least one workflow step performer assigned to the workflow step, and wherein the third blockchain transaction is associated with an error hash;

identifying, from the smart contract, a last complete workflow step from the plurality of workflow steps in the workflow;

determining, from the plurality of workflow steps, one or more next workflow steps, wherein the last complete workflow step is a prerequisite to the one or more next workflow steps; and sending a message to workflow step performers assigned to the one or more next workflow steps, from the registry of workflow step performers, to begin activities associated with the one or more next workflow steps.

16. The non-transitory machine-readable medium of claim 15, wherein the smart contract, when executed by a node in a blockchain network, causes the node to:

receive, from the at least one workflow step performer assigned to the workflow step, the first blockchain transaction; and verify that the workflow step is complete, wherein the verification is based on:

a determination that the first blockchain transaction comprises an indication that the workflow step is complete; and a determination that the first blockchain transaction is associated with the encryption keys of the at least one workflow step performer assigned to the workflow step by verifying that a public key of the at least one workflow step performer decrypts the first blockchain transaction; and update, in the smart contract, the status of the workflow step to indicate that the workflow step is complete.

17. The non-transitory machine-readable medium of claim 15, wherein the smart contract, when executed by a node of a blockchain network, cause the node to:

determine whether a status of a current workflow step from the plurality of workflow steps indicates that the current workflow step is complete;

determine, based on a determination that the current workflow step is complete and from the plurality of workflow steps, one or more next workflow steps, wherein the current workflow step is a prerequisite to the one or more next workflow steps; and send a message to workflow step performers assigned to the one or more next workflow steps, from the registry of workflow step performers, to begin activities associated with the one or more next workflow steps.

18. The non-transitory machine-readable medium of claim 15, wherein the first blockchain transaction further comprises at least one of the following:

a timestamp indicating a time and a date for when the workflow step was completed; and an indication for a location where the workflow step was completed.

19. The non-transitory machine-readable medium of claim 15, wherein determining the completion of the execution of the task is further based on determining whether each of the plurality of workflow steps is complete.

20. The non-transitory machine-readable medium of claim 15, wherein the smart contract, when executed by a node of a blockchain network, cause the node to verify the encryption keys of the at least one workflow step performer assigned to the workflow step by verifying that a public key of the at least one workflow step performer decrypts the first blockchain transaction.

* * * * *